United States Patent
Aalbu

(10) Patent No.: US 10,942,575 B2
(45) Date of Patent: Mar. 9, 2021

(54) 2D POINTING INDICATOR ANALYSIS

(71) Applicant: Cisco Technology, Inc., San Jose, CA (US)

(72) Inventor: Lars Erik Aalbu, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 281 days.

(21) Appl. No.: 15/615,846

(22) Filed: Jun. 7, 2017

(65) Prior Publication Data

US 2018/0356894 A1     Dec. 13, 2018

(51) Int. Cl.
*G06F 3/01* (2006.01)
*G06K 9/00* (2006.01)
*G06F 3/0481* (2013.01)

(52) U.S. Cl.
CPC .............. *G06F 3/017* (2013.01); *G06F 3/012* (2013.01); *G06F 3/0481* (2013.01); *G06K 9/00221* (2013.01); *G06K 9/00355* (2013.01)

(58) Field of Classification Search
CPC ...... G06F 3/017; G06F 3/0354; G06F 3/0488; G06F 3/0487; G06F 3/0484; G06F 3/04817; G06F 2203/04808; G06F 2203/048; G06F 3/0482; G06F 3/0416; G06F 2203/04804; G06F 3/012; G06F 3/0481; G06T 1/20
See application file for complete search history.

(56) References Cited

U.S. PATENT DOCUMENTS

| | | | |
|---|---|---|---|
| 6,088,018 A * | 7/2000 | DeLeeuw | G06F 3/011 345/156 |
| 8,644,467 B2 | 2/2014 | Catchpole | |
| 8,659,658 B2 | 2/2014 | Vassigh et al. | |
| 9,110,557 B2 | 8/2015 | Tresser et al. | |
| 9,111,138 B2 | 8/2015 | Kirby et al. | |
| 9,372,546 B2 | 6/2016 | Yin et al. | |
| 9,377,859 B2 | 6/2016 | Clarkson | |
| 9,524,425 B2 | 12/2016 | Yamashita | |
| 2010/0329509 A1* | 12/2010 | Fahn | G06K 9/00389 382/103 |
| 2011/0267265 A1* | 11/2011 | Stinson | G06F 3/017 345/157 |

(Continued)

FOREIGN PATENT DOCUMENTS

JP     05916680     5/2016

OTHER PUBLICATIONS

Stonekick: Using basic trigonometry to measure distance; Published date Jun. 25, 2013 (Year: 2013).*

(Continued)

*Primary Examiner* — Sherrod L Keaton

(57) ABSTRACT

In one embodiment, a method includes identifying a face, of a meeting attendee pointing to a display screen, in a first two-dimensional image from a two-dimensional video, determining at least one dimension of the face in the first two-dimensional image, defining a rectangle in the first two-dimensional image, at least one first dimension of the rectangle being a function of the at least one dimension of the face, searching for an image of a pointing indicator in the rectangle resulting in finding the pointing indicator at a first position in the rectangle, and calculating a cursor position of a cursor on the display screen based on the first position. Related apparatus and methods are also described.

20 Claims, 12 Drawing Sheets

(56) References Cited

U.S. PATENT DOCUMENTS

| | | | | |
|---|---|---|---|---|
| 2012/0081533 | A1* | 4/2012 | Fan | H04N 7/183 348/78 |
| 2013/0076625 | A1* | 3/2013 | Yamashita | G06F 3/041 345/157 |
| 2014/0022161 | A1* | 1/2014 | Leyvand | G06K 9/00362 345/156 |
| 2014/0022172 | A1* | 1/2014 | Huang | G06F 3/017 345/158 |
| 2014/0062882 | A1* | 3/2014 | Ozawa | G06F 3/038 345/158 |
| 2014/0300684 | A1* | 10/2014 | Fagadar-Cosma | G06F 3/017 348/14.03 |
| 2016/0170492 | A1* | 6/2016 | DeBattista | G06F 3/0425 345/156 |
| 2017/0251172 | A1* | 8/2017 | McNelley | H04N 7/155 |
| 2018/0061116 | A1* | 3/2018 | Mitchell | G06F 3/012 |

OTHER PUBLICATIONS

Planetcalc pp. 1-4 @2012.*

Stonekick (Using basic trigonometry to measure distance; Published date Jun. 25, 2013).*

PlanetCalc pp. 1-4 published 2012.*

Yang, Ahuja; "Face Detection and Gesture Recongnition for Human-Computer Interaction"; (The International Series in Video Computing, vol. 1) NY, Springer Verlag, 2001, pp. 4-5.

Xu, Jun et al; "A Real-Time Hand Detection System during Hand over Face Occlusion" International Journal of Multimedia and Ubiquitous Engineering 10, No. 8 (2015): 287-302.

Shukla, Dadhichi et al.; "Probabilistic detection of pointing directions for human-robot interaction." In Digital Image Computing Techniques and Applications (DICTA), 2015 International Conference on, pp. 1-8. IEEE, 2015.

Nickel, Kai et al; "Pointing Gesture Recognition based on 3DTracking of Face, Hands, and Head Orientaion"; in: Proceeedings of the 5th international conference on Multimodal interfaces (ICMI 2003). ACM, New York, NY, USA, 140-146.

Marks, Richard; EyeToy Innovation and Beyond—Play Station Blog (2010); available on the web at: http://blog.us.playstation.com/2010/11/03/eyetoy-innovation-and-beyond/comment-page-2/#comment-478157.

Carbini, Sébastien et al; "Pointing Gesture Visual Recongnition By Body Feature Detection And Tracking"; in Computer Vision and Graphics; vol. 32; International Conferecne, ICCVG 2004, Warsaw, Poland, Sep. 2004.

* cited by examiner

2D POINTING INDICATOR ANALYSIS

TECHNICAL FIELD

The present disclosure generally relates to two-dimensional (2D) analysis of pointing indicators.

BACKGROUND

During meetings, it is very common to have participants in a room comment on the contents of a presentation slide. Often, the participants are pointing to a specific line or figure that they are commenting on, but it can be difficult for the other meeting participants to see exactly where the person is pointing. Research and development has been performed in the area of pointing detection, but usually, pointing detection is regarded as a special case in a generic gesture control scheme, often requiring very complex solutions to build a three-dimensional (3D) representation of a scene. 3D solutions typically require additional sensors and/or additional cameras (stereoscopic/triangulating, with angles from small up to 90 degrees).

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

An embodiment of the present disclosure includes a method including identifying a face, of a meeting attendee pointing to a display screen, in a first two-dimensional image from a two-dimensional video, determining at least one dimension of the face in the first two-dimensional image, defining a rectangle in the first two-dimensional image, at least one first dimension of the rectangle being a function of the at least one dimension of the face, searching for an image of a pointing indicator in the rectangle resulting in finding the pointing indicator at a first position in the rectangle, and calculating a cursor position of a cursor on the display screen based on the first position.

DETAILED DESCRIPTION

Figure 1:
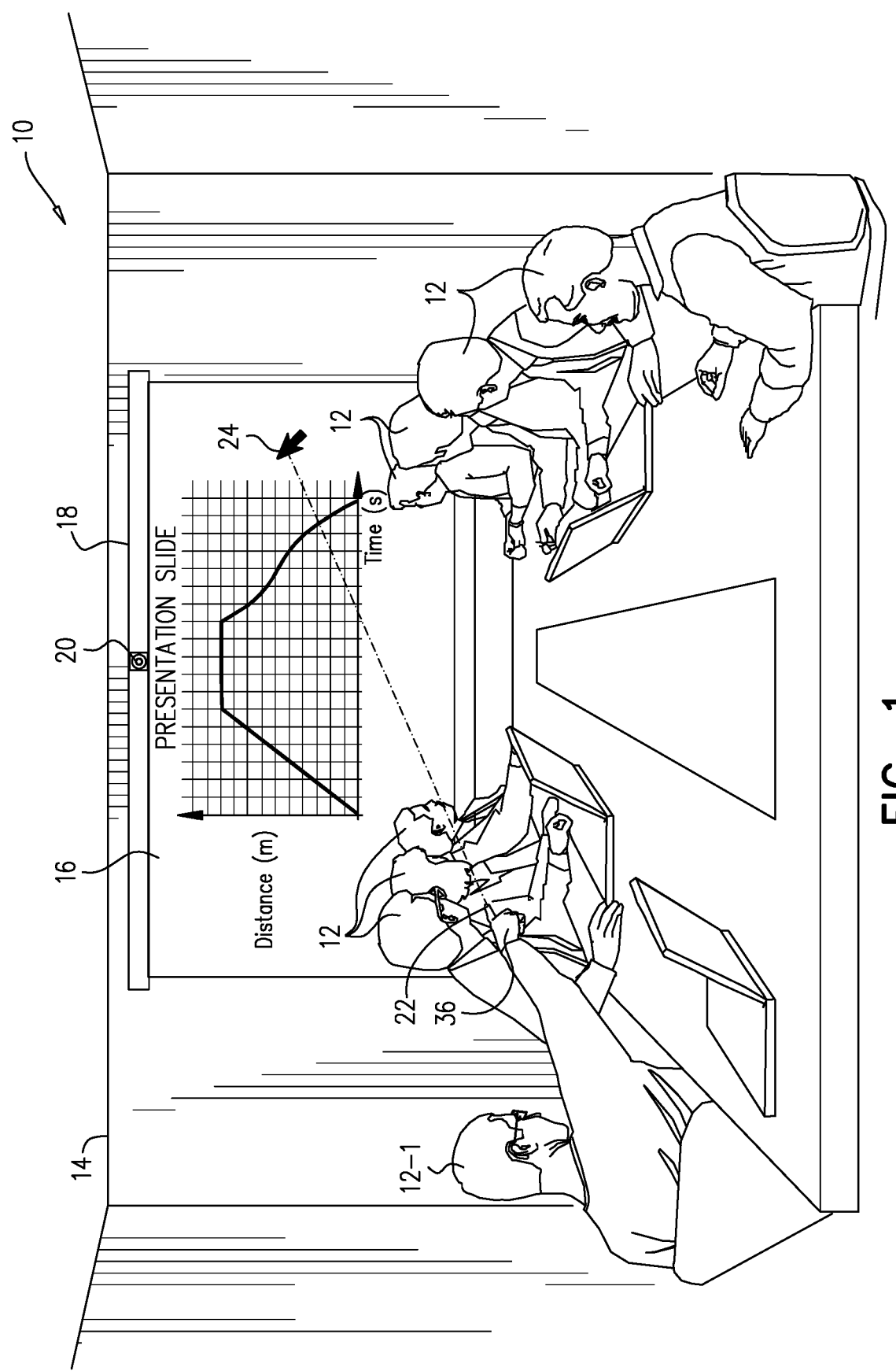
FIG. 1 is a pictorial view of a cursor positioning system constructed and operative in accordance with an embodiment of the present disclosure.
Figure 2:
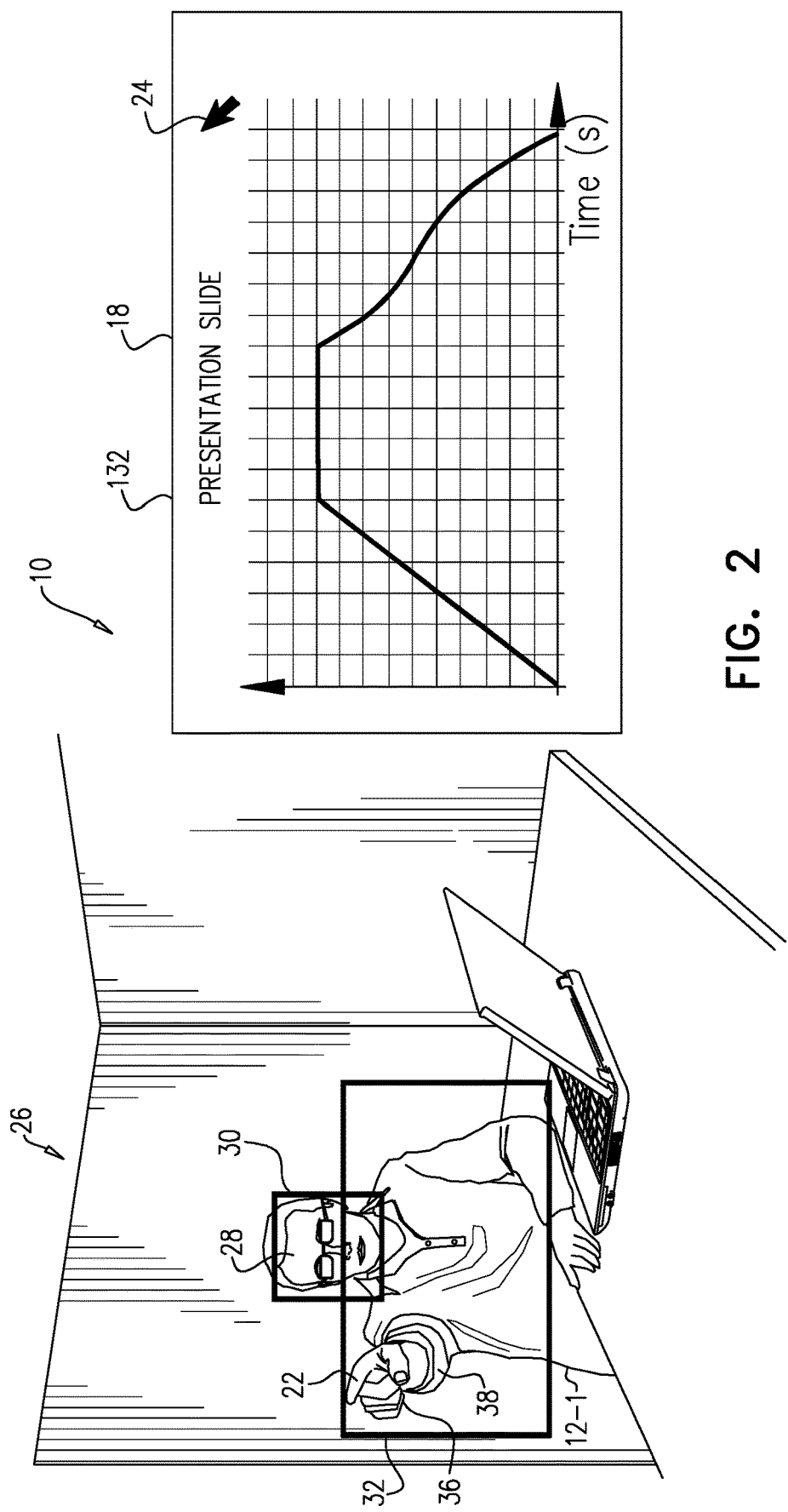
FIGS. 2-5 are pictorial views illustrating calculation of cursor positions in the system of FIG. 1.
Figure 3:
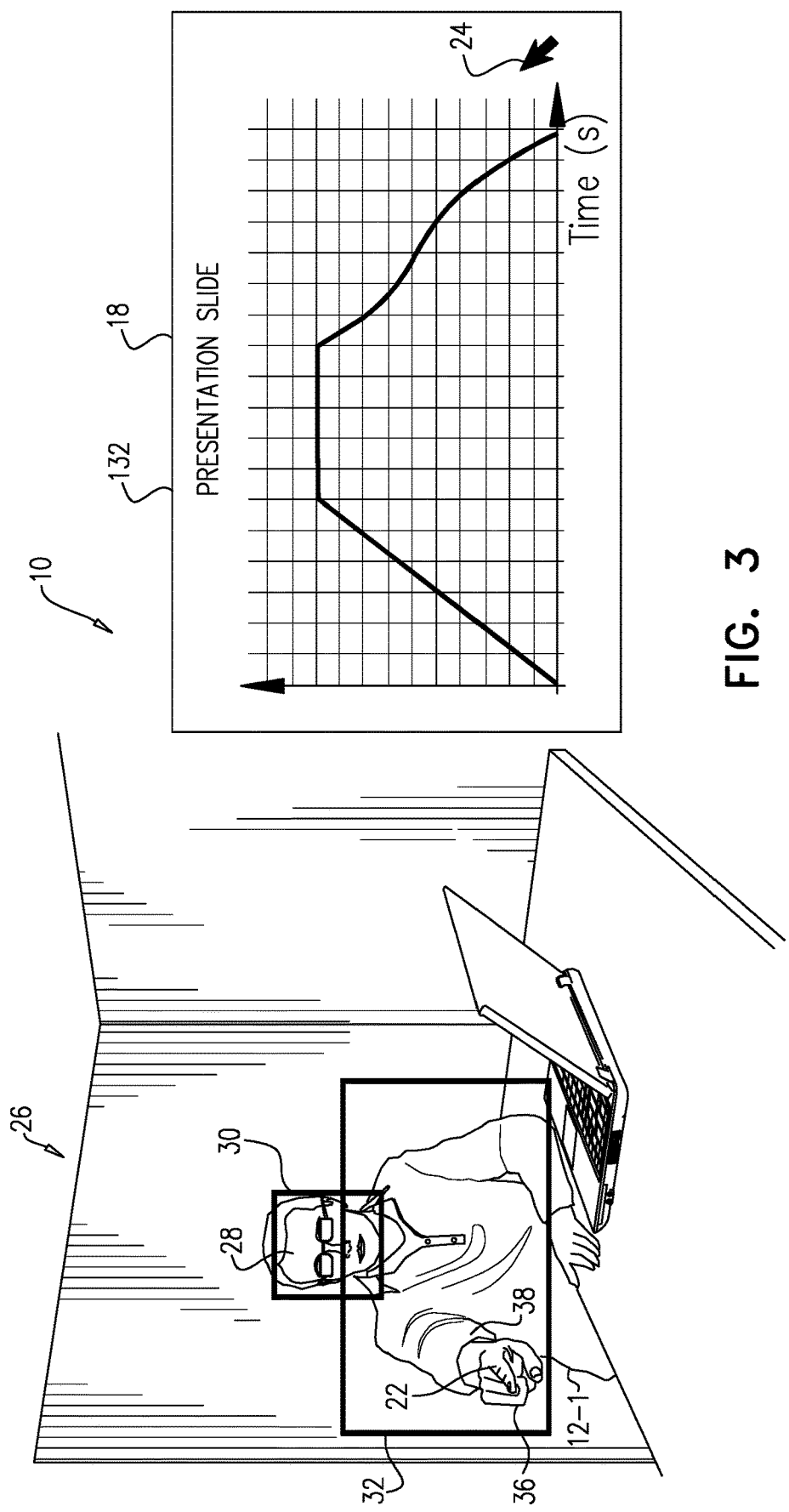
Figure 4:
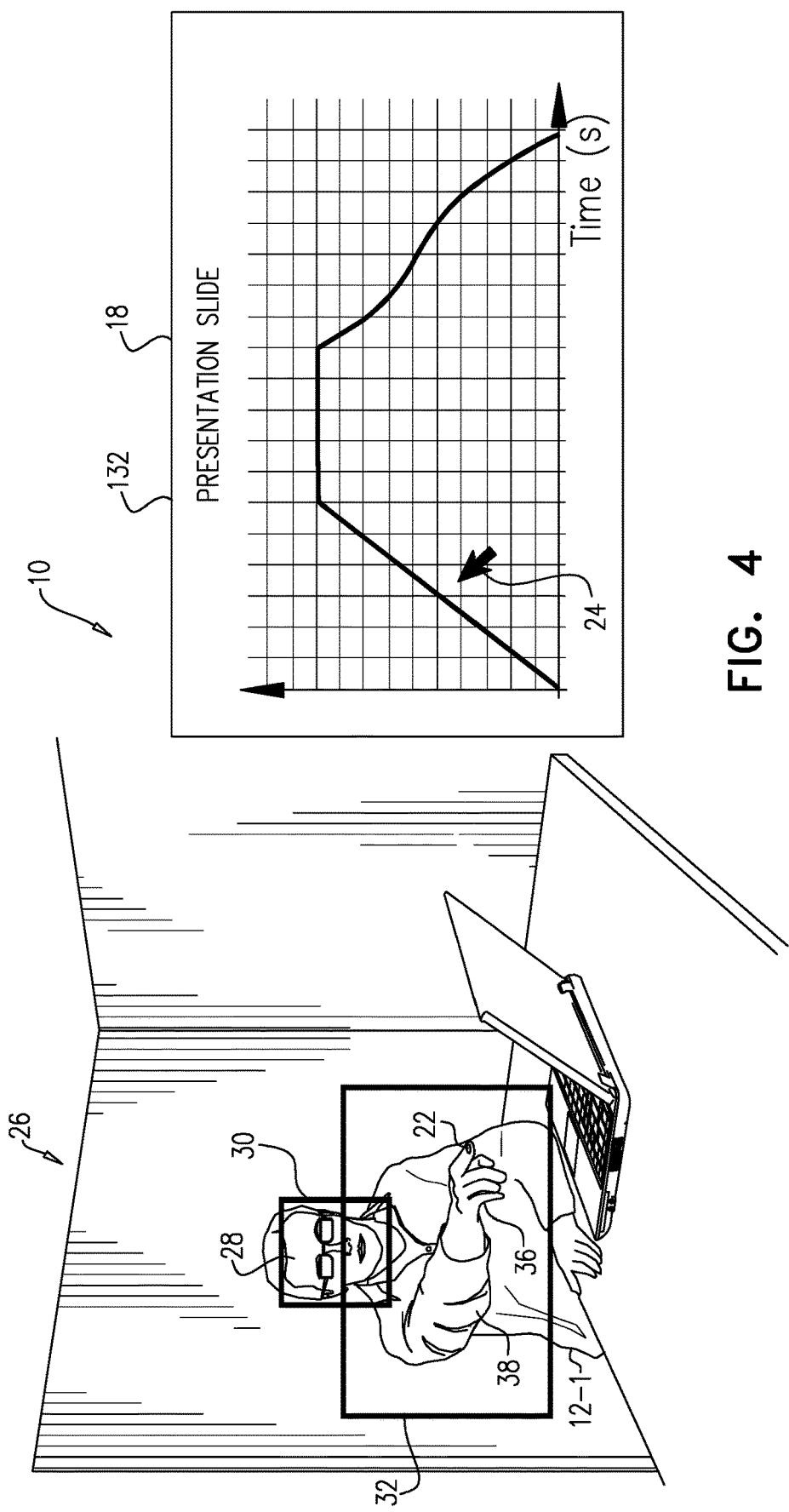

Reference is now made to FIG. 1, which is a pictorial view of a cursor positioning system 10 constructed and operative in accordance with an embodiment of the present disclosure. FIG. 1 shows a plurality of meeting attendees 12 attending a meeting in a conference room 14. The meeting may be a teleconference or video conference with one or more other meeting locations or the meeting may be a stand-alone meeting among the meeting attendees 12 in the conference room 14. The meeting includes presenting an exemplary content item 16 on a display screen 18. A video camera 20 is shown in FIG. 1 centrally located atop the display screen 18. It will be appreciated that the video camera 20 may be disposed at other locations around the display screen 18. It will be appreciated than one or more other video cameras may be disposed in the conference room 14 for use in a video conference. The video camera 20 is typically a two-dimensional video camera for capturing two-dimensional images as part of a two-dimensional video. Optionally, the camera 20 includes three-dimensional, depth capturing, capabilities. One of the meeting attendees 12, a meeting attendee 12-1, is shown pointing with a finger 22 to the display screen 18. The camera 20 captures images of the meeting attendee 12-1 including the finger 22. The cursor positioning system 10 calculates a cursor position of a cursor 24 on the display screen 18 based on one or more of the captured images and displays the cursor 24 on the display screen 18 over the content item 16. As the finger 22 of the meeting attendee 12-1 is moved around, this movement is detected by the cursor positioning system 10 and new cursor positions are calculated and the cursor 24 is moved to the newly calculated positions on the display screen 18 over the content item 16. The assumption is that if the cursor 24 is not placed absolutely correctly at first, the meeting attendee 12-1 naturally adjusts the position of a hand 36 so that the cursor 24 is moved to the correct place in a similar manner to mouse control by a computer user.

Figure 5:
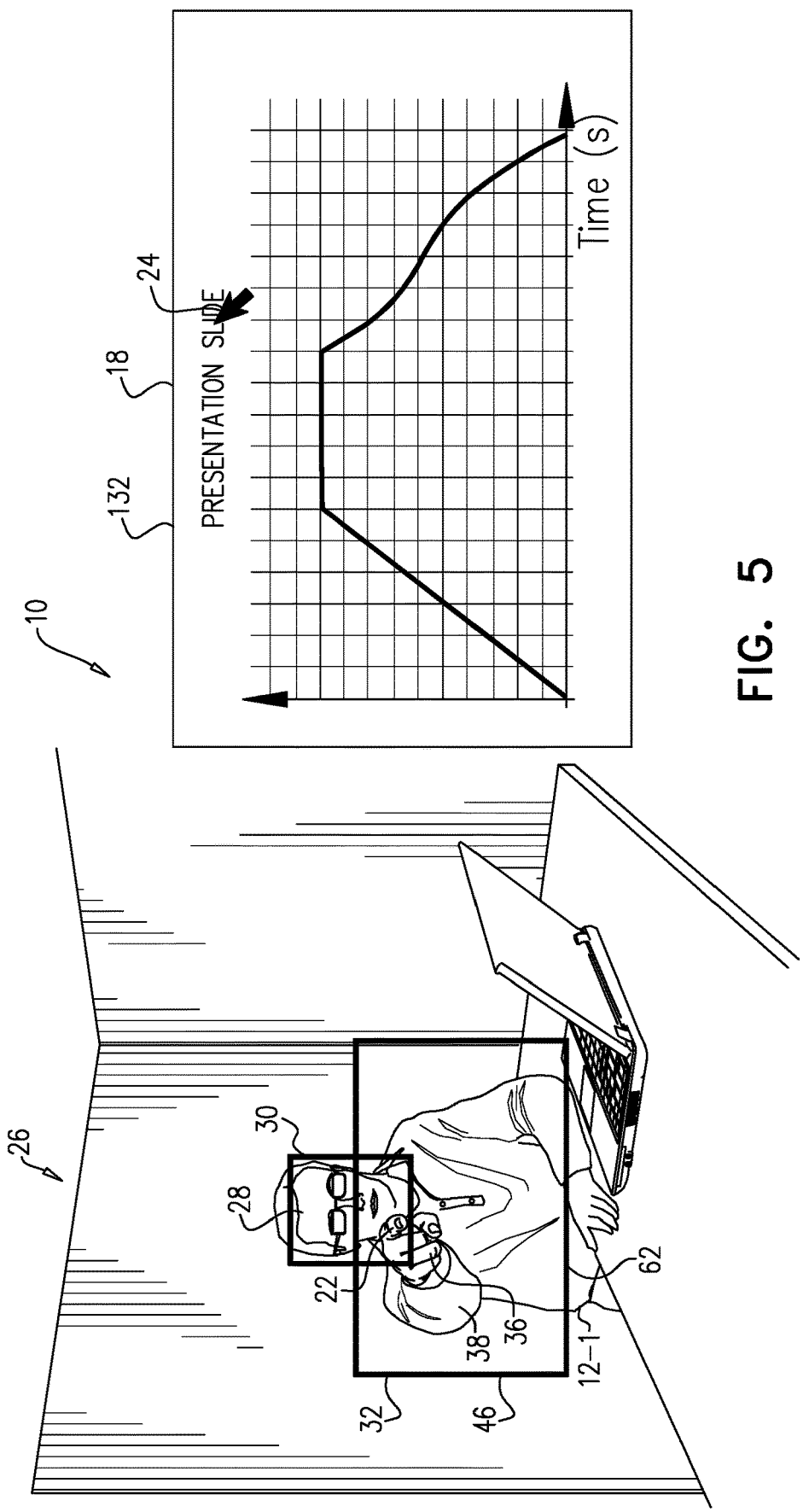

Reference is now made to FIGS. 2-5, which are pictorial views illustrating calculation of cursor positions in the system 10 of FIG. 1. FIGS. 2-5 show different images 26 of the meeting attendee 12-1 pointing with the finger 22 towards different positions on the display screen 18. A face 28 of the meeting attendee 12-1 is identified in each of the images 26. Face detection algorithms are well known and readily available on a large range of equipment, even on existing video-conferencing systems. Some care must be taken if the face detection algorithm is sensitive to hands covering parts of the detected face 28 as shown in FIG. 5. The cursor positioning system 10 detects and records the position and size (at least one dimension) of the face 28. The face 28 is shown surrounded by a box 30 in the images 26 for the sake of illustration only. A rectangle 32 is defined and is also shown in the images 26 for the sake of illustration only. The rectangle 32 defines a bounding box which likely includes the hand 36 with the finger 22 of the meeting attendee 12-1. The position and dimensions of the rectangle 32 within each of the images 26 are generally based on one or more of the following: one or more dimensions of the face 28; one or more dimensions of the display screen 18; a relative position of the face 28 with respect to the display screen 18; and a field of view of the camera 20 (FIG. 1) as will be described in more detail with reference to FIGS. 6A-7B.

The cursor positioning system 10 searches for the hand 36 with the pointing finger 22 in the rectangle 32 of each of the images 26. A sliding window detection is used to search for the hand 36 with the pointing finger 22 within the rectangle 32 of each image 26 using an object recognition method for example, but not limited to, a neural network object recognition system. Hands are known to have a large variation of size, shape, color etc. and different people point differently. In order to provide accurate results, the neural network receives input of enough images of pointing hands, non-pointing hands and other images from the conference room 14 (FIG. 1) such as faces, clothes, chairs, computers etc.) to train the neural network. The size of the sliding window may be sized according to an expected size of the hand 36 with the pointing finger 22. It will be appreciated that expected size of the hand 36 with the pointing finger 22 may be based on a size of the detected face 28. The sliding window is moved across the rectangle 32 until the hand 36 with the pointing finger 22 is found by the object recognition system in the sliding window. Alternatively, the search for the image of the pointing finger 22 may be performed without using a sliding window, based on any other suitable image recognition technique for example, but not limited to, Scale-invariant feature transform (SIFT).

When the hand 36 with the pointing finger 22 is found in the rectangle 32, the position of the hand is used to determine a corresponding cursor position of the cursor 24 over the content item 16 on the display screen 18. It will be noted that the position of the cursor 24 on the display screen 18 is a horizontal flip of the position of the hand 36 with the pointing finger 22 found in the rectangle 32 with appropriate scaling to take into account the difference in sizes between the rectangle 32 and the display screen 18. As the detected face 28 moves, the rectangle 32 may be moved correspondingly. When the meeting is part of a video conference, the cursor position is generally transmitted to the remote video equipment as well, either in encoded video or through a parallel communication channel for display on display device(s) in the remote locations.

It should be noted that neural network object recognition may not be performed on each of the images 26 captured by the camera 20 (FIG. 1). Neural network object recognition may be performed periodically, for example, but not limited to, every 100 milliseconds or every one or several seconds. An object tracking technique, such as edge detection, may be used to detect movement of the detected hand 36 with the pointing finger 22 between detections by the neural network object recognition process. Combining the neural network object recognition with object tracking may result in a quicker cursor movement than the using neural network object recognition alone. In any event, the presence of the hand 36 with the pointing finger 22 may be reconfirmed periodically using the neural network object recognition. Whenever the neural network object recognition no longer detects the hand 36 with the pointing finger 22, the cursor 24 is typically removed from the display screen 18.

It should be noted that the cursor positioning system 10 does not try to find the exact point on the display screen 18 that the meeting attendee 12-1 is pointing to. The cursor positioning system 10 generally does not take into account the direction of the finger 22 of the meeting attendee 12-1, or the direction of the hand 36 or an arm 38, but rather how the face 28 and the hand 36 are positioned relative to the camera 20. As described above, the assumption is that if the cursor 24 is not placed absolutely correctly at first, the meeting attendee 12-1 naturally adjusts the position of the hand 36 so that the cursor 24 is moved to the correct place in a similar manner to mouse control by a computer user.

Three methods for estimating the size and position of the rectangle 32 in each of the images 26 are now described. The methods discuss calculating a height 46 and a width 62 of the rectangle 32. The first method is described with reference to FIGS. 6A-C, the second method is described with reference to FIG. 7 and the third method is described after the second method.

Figure 6A:
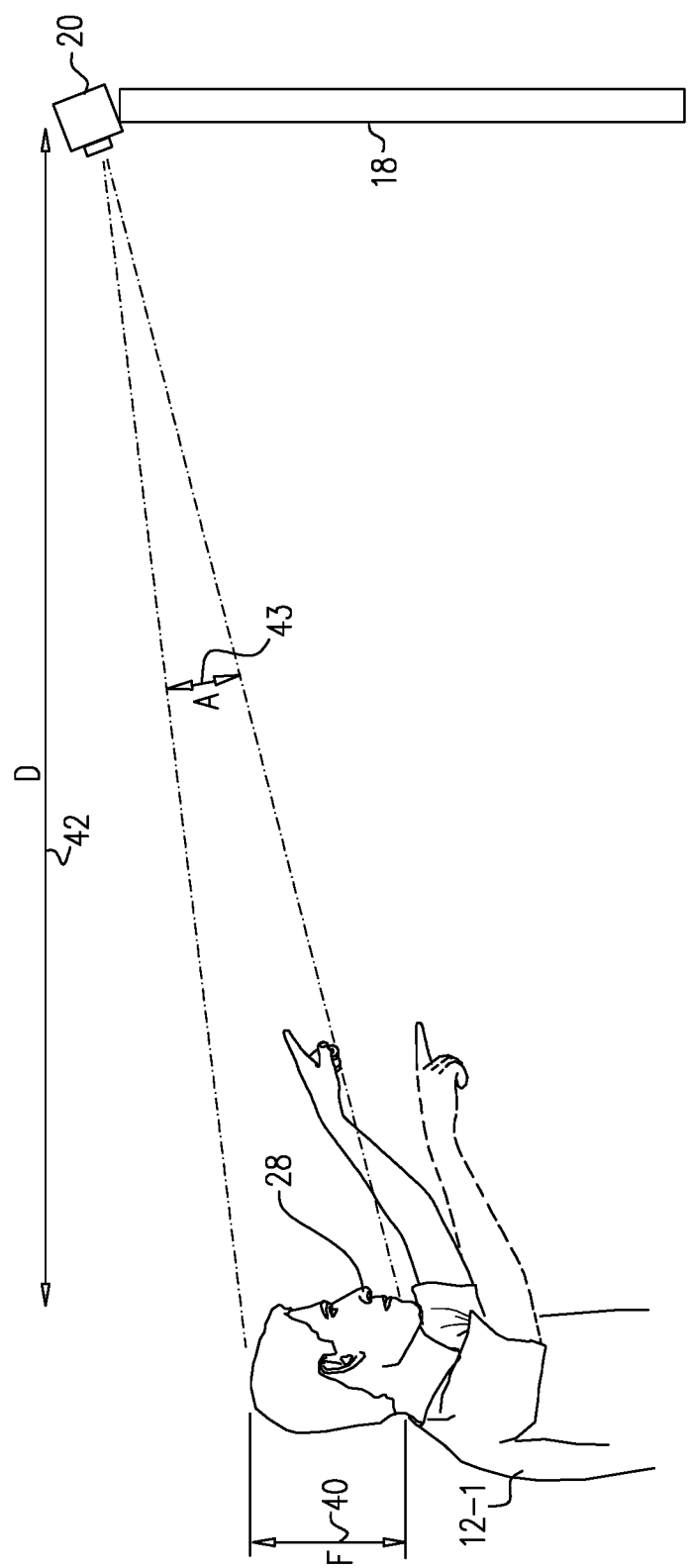
FIGS. 6A-6C are side views of a meeting attendee pointing at a display screen illustrating a method of calculation of a vertical dimension for use in the system of FIG. 1.

Reference is now made to FIG. 6A, which is a side view of the meeting attendee 12-1 pointing at the display screen 18. The cursor positioning system 10 is operative to provide an estimation of a distance (D) 42 from the display screen 18 to the meeting attendee 12-1 based on an assumption about the average length (F) 40 of a human adult face and an angular height (A) 43 of the face 28 in the image 26 (FIGS. 2-5). The angular height (A) 43 of the face 28 in the image 26 may be determined from the height of the face 28 in the image 26 and knowledge of the field of view of the camera 20. For example, if the height of the face 28 occupies 6% of the image 26 and the field of view of the camera 20 is 90 degrees, then the angular height (A) 43 of the face 28 is 5.4 degrees. Assuming minor errors for small angles, the distance (D) 42 may be calculated by:

$$D = \frac{F}{\tan(A)}$$

The average height of the human adult face from the menton to the crinion according to one study is between 18 to 19 centimeters (cm). By way of example, assuming the face length (F) 40 is 18 cm and angular height (A) 43 is 5.4 degrees, the distance (D) 42 is 190 cm. It will be appreciated that other measurements of the face 28 may be used in the calculating the distance (D) 42 (and any of the other distances described herein), for example, but not limited to, the distance from the stomion to the top of the head.

Figure 6B:
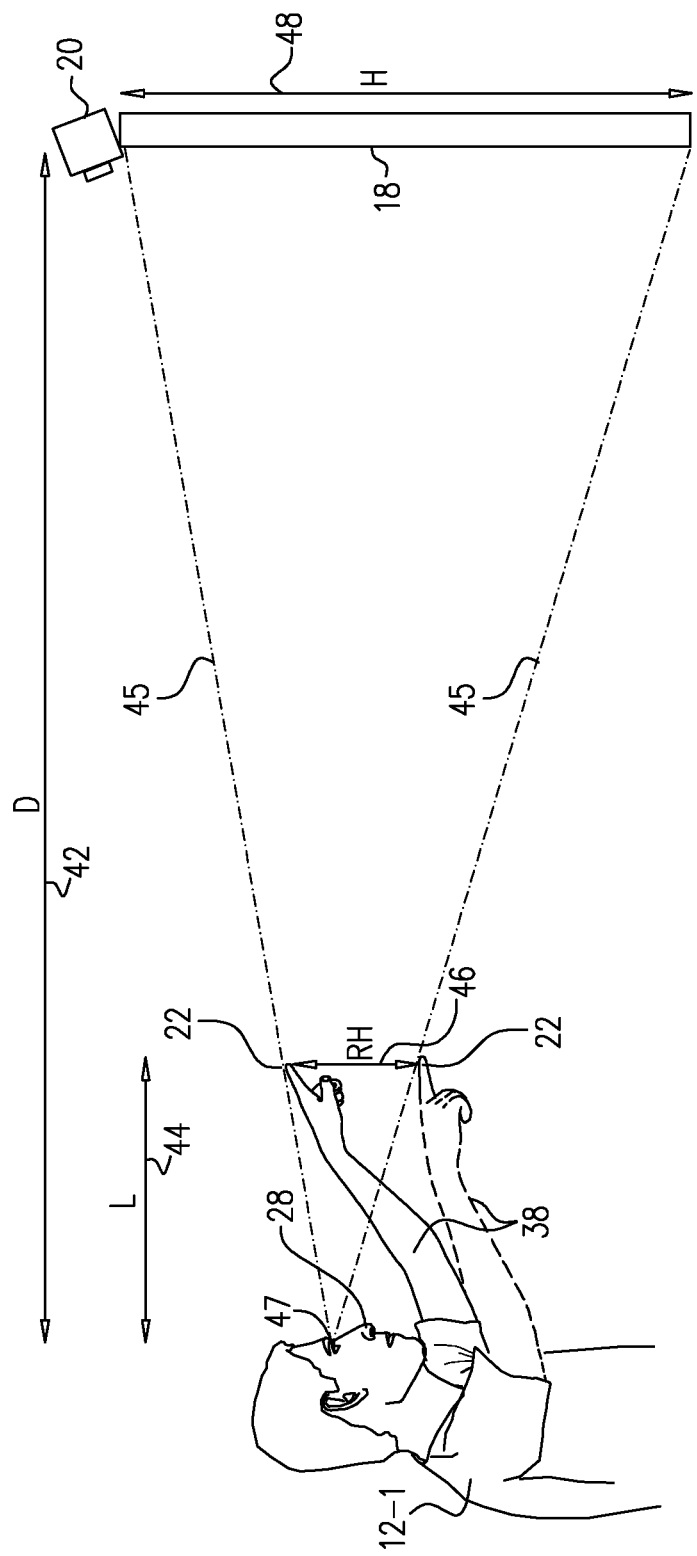

Reference is now made to FIG. 6B. FIG. 6B shows the finger 22 pointing to the top (solid line used for arm 38) and pointing to the bottom (dotted line used for arm 38) of the display screen 18. Lines 45 show the line of sight from an eye 47 (or eyes 47) of the meeting attendee 12-1 to the top and bottom of the display screen 18. It can be seen that a ratio between the height (RH) 46 and an estimated length (L) 44 of the arm 38 is equal to a ratio between a known height (H) 48 of the display screen 18 and the distance (D) 42 between the display screen 18 and the face 28. The above ratios may be expressed as follows:

$$\frac{RH}{L} = \frac{H}{D}$$

which may be rearranged as, $$RH = \frac{H \cdot L}{D}$$

Therefore, the height (RH) 46 of the rectangle 32 may be estimated based on the estimated length (L) 44 of the arm 38, the known height (H) 48 of the display screen 18 and the estimated distance (D) 42 between the display screen 18 screen and the face 28. By way of example, assuming a typical arm length of 60 cm, a screen height of 70 cm, and a distance (D) 42 of 190 cm, the height (RH) 46 of the rectangle 32 is 22 cm. It will be appreciated that the length 44 of the arm 38 may alternatively be estimated based on image recognition and analysis of the arm 38 in the image

26. It will be appreciated that the estimated height (RH) 46 may be over estimated by a certain value, for example, but not limited to, 10% or 25%, or any other suitable value, so that the height (RH) 46 ensures that the rectangle 32 is tall enough to encompass the high and low positions of the hand 36 pointing at the display screen 18 and also to take into account that the various distances and positions discussed above are generally based on estimations and assumptions about the human body. If the height 46 is over-estimated too much then some of the meeting attendees 12 may be unable to reach the corners of the rectangle 32 which correspond to moving the cursor 24 (FIGS. 2-5) to the corners of the display screen 18.

Figure 6C:
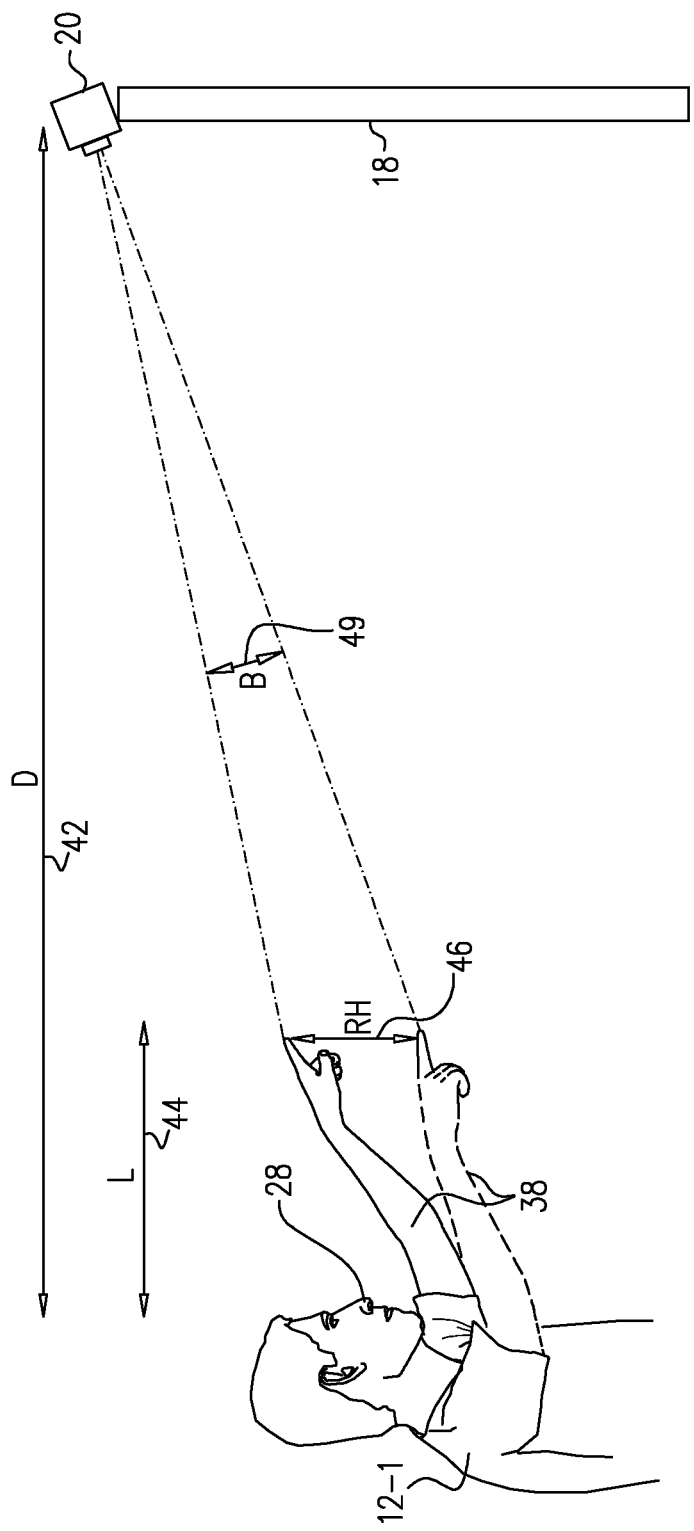

Reference is now made to FIG. 6C. An angular size (B) 49 of the height 46 in the image 26 (FIG. 5) may be determined using the following formula.

$$B = \tan^{-1}\left(\frac{RH}{D-L}\right)$$

Using the exemplary dimensions used in FIGS. 6A and 6B gives an angular size (B) 49 of 9.6 degrees. An angular width of the rectangle 32 (FIG. 5) may be estimated using the angular size (B) 49 and an aspect ratio of the display screen 18. So for example, if the screen has a height of 70 cm and a width of 105 cm, then the angular width of the rectangle 32 in the image 26 (FIG. 5) will be:

$$9.6 \cdot \frac{105}{70} = 14.4 \text{ degrees}$$

Alternatively, an angular width may be estimated using other geometric calculations described in more detail with reference to FIG. 7.

Positioning of the rectangle 32 (FIG. 5) in the image 26 (FIG. 5) is now discussed. The top of the rectangle 32 may be disposed at the level of the eyes 47 which may be assumed to be half way up the box around the face 28. It will be appreciated that this may need some individual adjustment based on the specific face detection implementation. Additionally, an average user would probably hold his/her hand slightly lower than on the direct line between the eye 47 and the point being pointed to and therefore the top of the rectangle 32 may be lower than the level of the eyes 47. User testing may need to be performed to determine the most natural position of the rectangle 32.

It may be assumed that horizontal positioning of the rectangle 32 is such that a center of the rectangle 32 is centered horizontally with the face 28. Accuracy may be improved for meeting attendees 12 sitting off-axis from the display screen 18 and the camera 20, so that the rectangle 32 is shifted more to one side of the face 28. Adjustments for off-axis positioning may be determined based on practical user testing in the conference room 14 (FIG. 1).

Another factor with off-axis sitting is that faces will have the same height but are generally narrower than centrally sitting meeting attendees 12. In such a case, accuracy of the rectangle 32 may be improved by making the rectangle 32 narrower, probably by a factor close to cosine(alpha) where alpha is the angle to the face 28 from the camera 20 center line.

The height and width of the rectangle 32 may be estimated using the above mentioned method for future calculations of the dimensions of the rectangle 32. Alternatively, as it is known that the height 46 of the rectangle 32 is 9.6/5.4=1.78 times the length of the face 28 in the image 26 (FIGS. 2-5) in the above mentioned example, it may be assumed that during future calculations that the height 46 is 1.78 times the length of the face 28 in the conference room 14 (FIG. 1) with the current set up of the display screen 18 and the camera 20.

Figure 7:
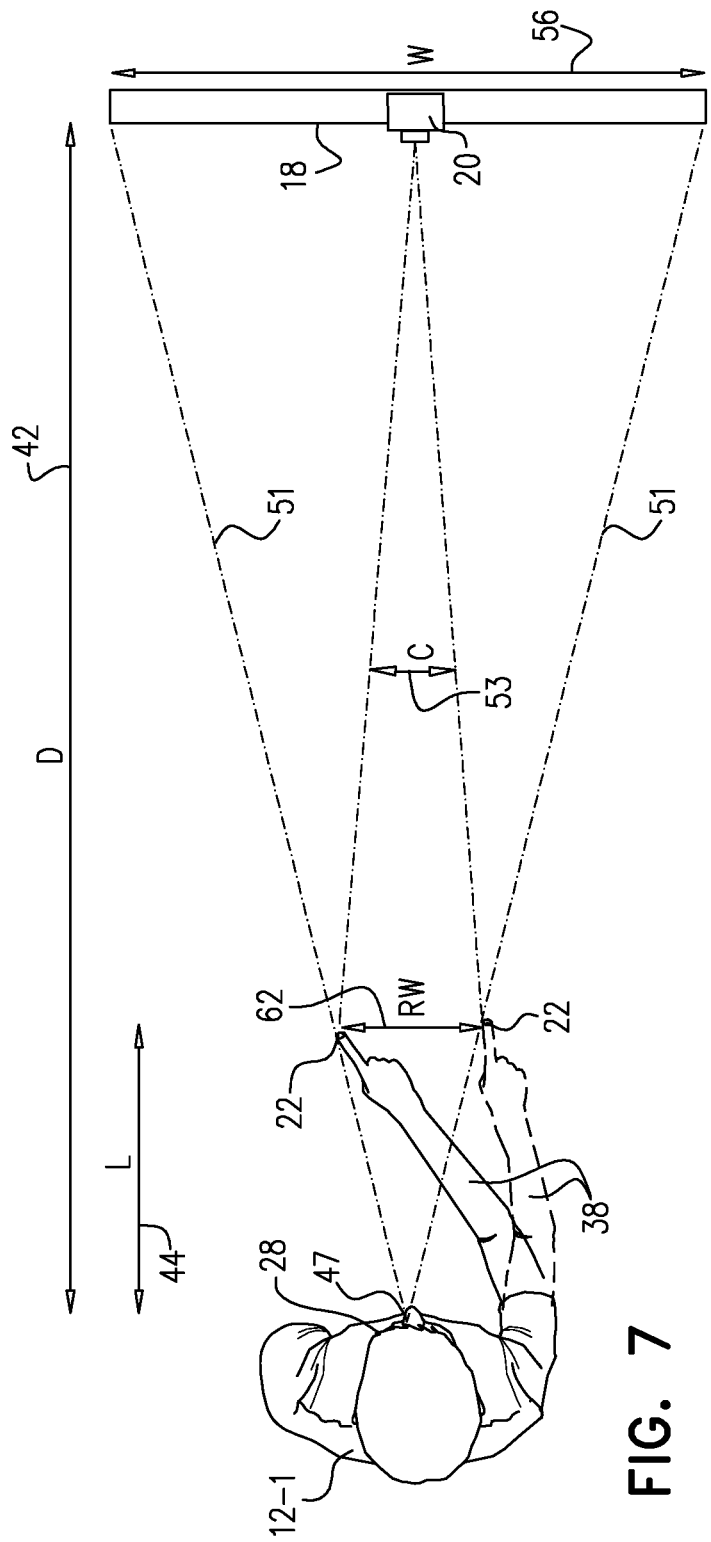
FIG. 7 is a plan view of a meeting attendee pointing at a display screen illustrating a method of calculation of a horizontal dimension for use in the system of FIG. 1.

Reference is now made to FIG. 7, which is a plan view of the meeting attendee 12-1 pointing at the display screen 18 illustrating a method of calculation of a horizontal dimension for use in the system 10 of FIG. 1. FIG. 7 shows the finger 22 pointing to the left (solid line used for arm 38) and the right of the display screen 18 (dotted line used for arm 38). Lines 51 show the line of sight from the eyes 47 of the meeting attendee 12-1 to the left and right of the display screen 18. It can be seen that a ratio between the width (RW) 62 and an estimated length (L) 44 of the arm 38 is equal to a ratio between a known width (H) 56 of the display screen 18 and the distance (D) 42 between the display screen 18 screen and the face 28. The above ratios may be expressed as follows:

$$\frac{RW}{L} = \frac{W}{D}$$

which may be rearranged as, $$RW = \frac{W \cdot L}{D}$$

Therefore, the width (RW) 62 of the rectangle 32 (FIG. 5) may be estimated based on the estimated length (L) 44 of the arm 38, the known width (W) 56 of the display screen 18 and the estimated distance (D) 42 between the display screen 18 and the face 28 (for example calculated using the method described with reference to FIG. 6A). By way of example, assuming a typical arm length L of 60 cm, a screen width W of 105 cm, and a distance (D) 42 of 190 cm, the width (RW) 62 of the rectangle is calculated as 33 cm.

An angular size (C) 53 of the width 62 in the image 26 (FIG. 5) may be determined using the following formula:

$$C = 2\tan^{-1}\left(\frac{0.5 \cdot RW}{D-L}\right)$$

Using the exemplary dimensions above, the angular size (C) 53 of the width of the rectangle 32 is calculated as 14.4 degrees.

It will be appreciated that either the angular size B or angular size C may be calculated using the methods described above with reference to FIGS. 6A-C and FIG. 7, and the other angular size C or B may be calculated based on the known aspect ratio of the display screen 18, respectively. It will be appreciated that both the angular size B and the angular size C may be calculated using the methods described above with reference to FIGS. 6A-C and FIG. 7, respectively.

It will be appreciated that the estimated width 62 may be over estimated by a certain value, for example, but not limited to, 10% or 25%, or any other suitable value, so that the width 62 ensures that the rectangle 32 is wide enough to encompass the hand 36 pointing at the left and the right edges of the display screen 18. If the width 62 is over-estimated too much then some of the meeting attendees 12 may be unable to reach the corners of the rectangle 32 which correspond to moving the cursor 24 (FIGS. 2-5) to the corners of the display screen 18.

A simplified method for calculating the dimensions of the rectangle 32 (FIG. 1) may be based on assuming the width and/or height of the rectangle 32 are certain multiples of the face width and/or height (or other dimension of the face 28). The multiples used in the calculation may, or may not, be based on configuration testing of the cursor positioning system 10 (FIG. 1) in the conference room 14 (FIG. 1), for example by positioning the meeting attendee 12-1 at one or more positions in the conference room 14 with the meeting attendee 12-1 pointing to the top/bottom and/or left/right of the display screen 18 and measure the distance between the fingers 22 of the meeting attendee 12-1 at the various positions to give the dimension(s) of the rectangle 32.

Figure 8:
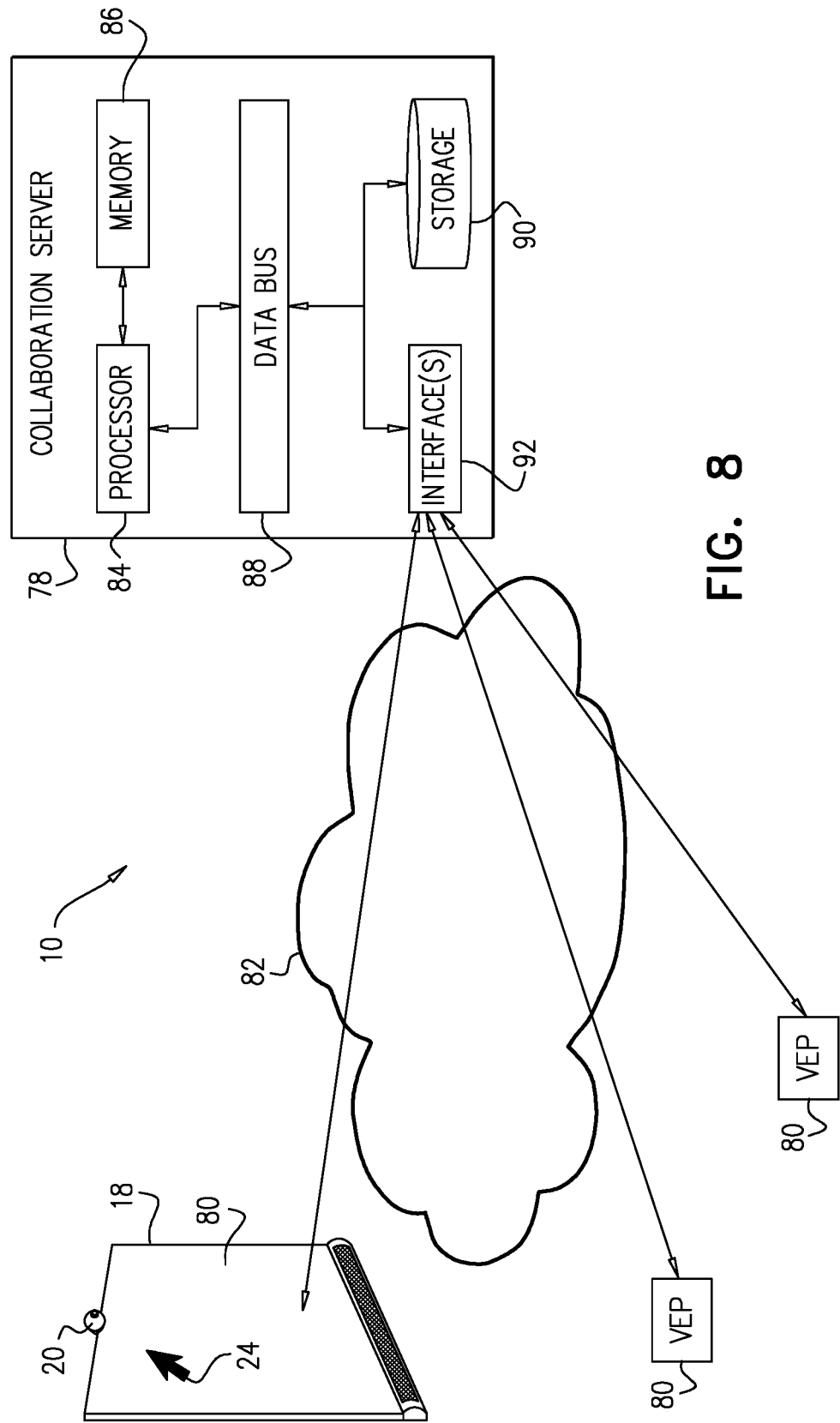
FIG. 8 is a partly pictorial, partly block diagram view of a collaboration server used in calculating a cursor position in the system of FIG. 1.

Reference is now made to FIG. 8, which is a partly pictorial, partly block diagram view of a collaboration server 78 used in calculating a cursor position in the system 10 of FIG. 1. The collaboration server 78 may be operative to establish and execute collaboration events between different video end-points (VEPs) 80 via a network 82. A video end-point is typically video and audio equipment for capturing and transferring video and audio to one or more other VEPs in other locations and receiving audio and video from one or more VEPs in other locations for rendering in the current location. The collaboration server 78 may also be operative to process collaboration event data such as calculating the cursor position of the cursor 24 on the display screen 18 included in one of the video end-points 80. It will be appreciated that the cursor position may be calculated for display on the display screen 18 without transmitting the cursor position and/or a presentation including the cursor 24 to any VEP in other locations, for example, but not limited to, when a video conference is not in process and the display screen 18 and camera 20 are being used to display presentation content locally to the meeting attendees 12 in the conference room 14 (FIG. 1) and not to meeting attendees 12 in other locations. The collaboration server 78 may include a processor 84, a memory 86, a data bus 88, a storage unit 90 and one or more interfaces 92. The memory 86 is operative to store data used by the processor 84. The data bus 88 is operative to connect the various elements of the collaboration server 78 for data transfer purposes. The storage unit 90 is operative to store various data including collaboration event data and other data used by the cursor positioning system 10. The interface(s) 92 are used to transfer data between the collaboration server 78 and the video end-points 80.

Figure 9:
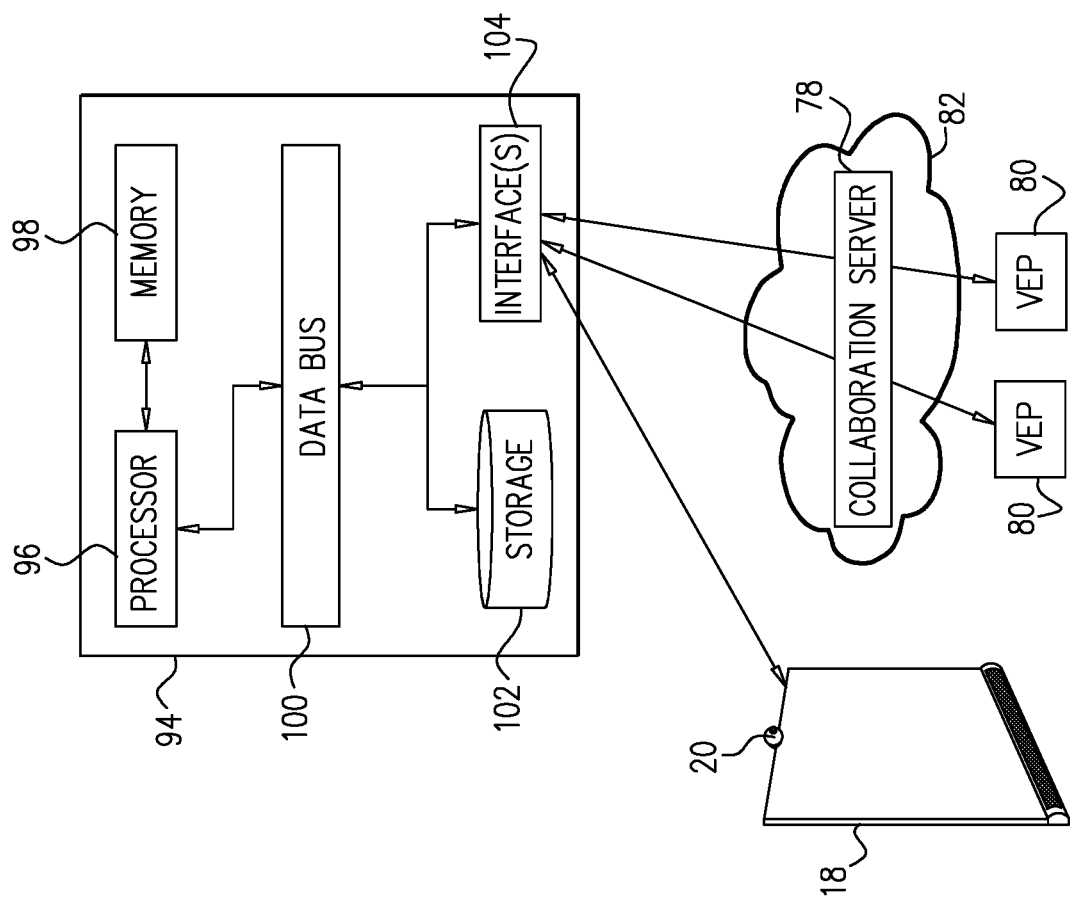
FIG. 9 is a partly pictorial, partly block diagram view of a device used in calculating a cursor position in accordance with an alternative embodiment of the present disclosure.

Reference is now made to FIG. 9, which is a partly pictorial, partly block diagram view of a device 94 used in calculating a cursor position in the system 10 of FIG. 1 in accordance with an alternative embodiment of the present disclosure. The device 94 may be disposed in the location of the conference room 14 (FIG. 1) where the display screen 18 and the camera 20 are located. The device 94 includes a processor 96, a memory 98, a data bus 100, a storage unit 102, and one or more interfaces 104. The memory 98 is operative to store data used by the processor 96. The data bus 100 is operative to connect the various elements of the device 94 for data transfer purposes. The storage unit 102 is operative to store various data including data used by the cursor positioning system 10. The interface(s) 104 are used to transfer data between the device 94 and the collaboration server 78 and the video end-points 80 via the network 82.

Figure 10:
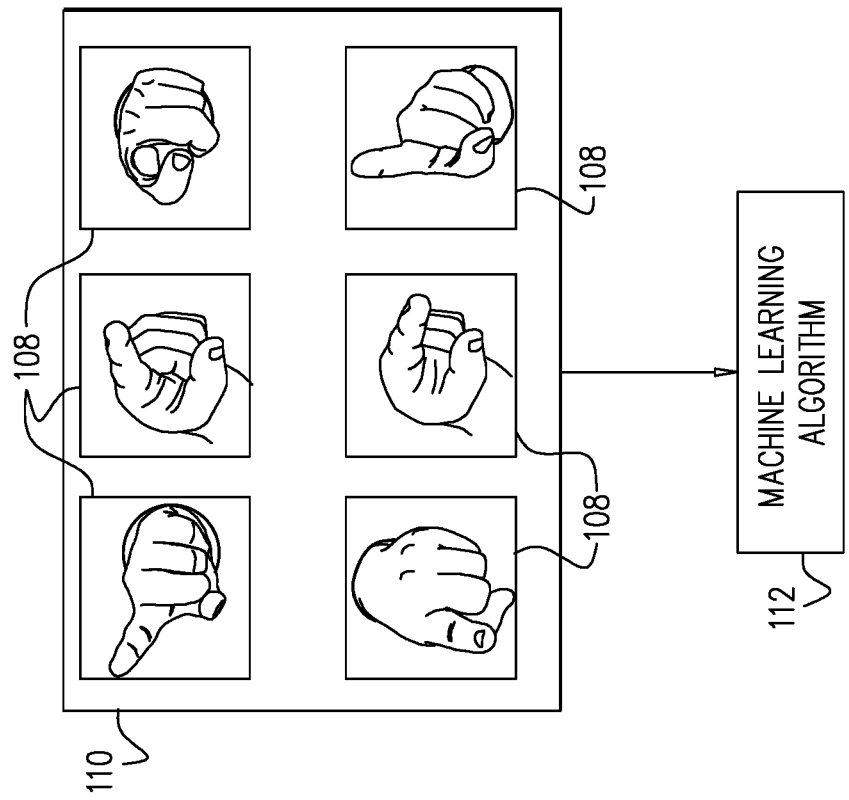
FIG. 10 is a diagram illustrating machine learning setup for use in the system of FIG. 1.

Reference is now made to FIG. 10, which is a diagram illustrating machine learning setup for use in the system 10 of FIG. 1. A plurality of images 108 of a hand with a pointing finger (shown) and hands without a pointing finger (not shown) and other images (not shown) from the conference room 14 (FIG. 1) such as faces, clothes, chairs, computers are collected (block 110). If other pointing indicators, for example, but not limited to, a hand holding a pen or a ruler, and/or part of a hand with a pointing finger, and/or part of a hand holding a pen or a ruler are to be used to point with, images of other pointing indicators may be used as well. The images 108 are input into a machine learning algorithm so that the machine learning algorithm can learn to find a hand with a pointing finger in an image (block 112).

Figure 11:
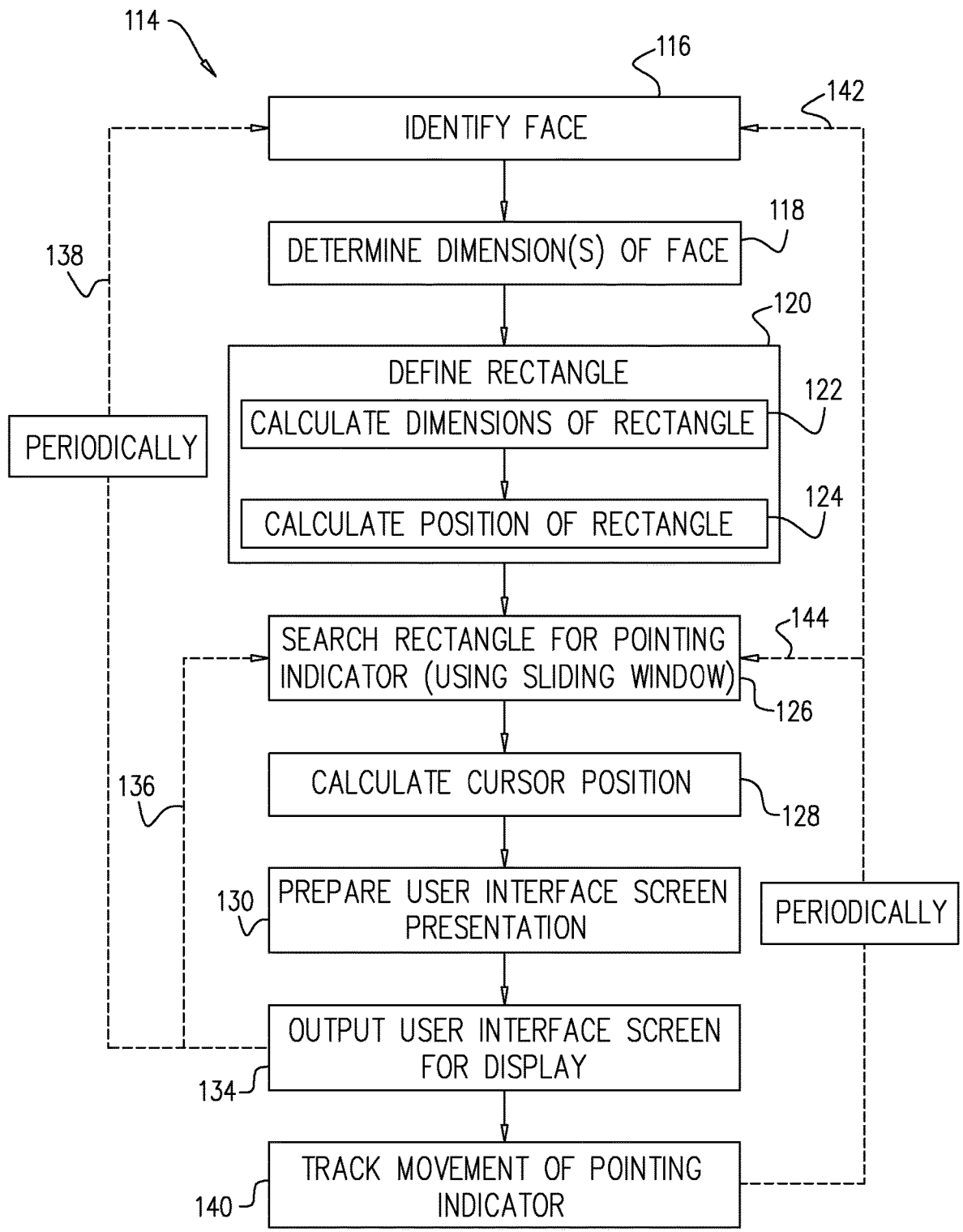
FIG. 11 is a flow chart showing exemplary steps in a method of calculating a cursor position in the system of FIG. 1.

Reference is now made to FIG. 11, which is a flow chart showing exemplary steps in a method 114 of calculating a cursor position in the system 10 of FIG. 1. The method 114 is described by way of the processor 96 of FIG. 9. It will be appreciated that the processor 84 (FIG. 8) may be used to perform one or more of the steps described below as being performed by the processor 96.

The processor 96 is operative to analyze one of the images 26 (FIGS. 2-5) and identify the face 28, of the meeting attendee 12-1 pointing to the display screen 18, in that image 26 (block 116). The image 26 is generally a two-dimensional image from a two-dimensional video. The step of block 116 is typically triggered by the content item 16 (FIG. 1) being shared on the display screen 18 (FIG. 1). If there is more than one face in that image 26, the processor 96 may be operative to find the talking face in that image 26 on which to base the definition of the rectangle 32 (FIGS. 2-5) or alternatively define the rectangle 32 for each face in the image 26 which may lead to more than one cursor 24 on the display screen 18, one cursor 24 per pointing finger. The processor 96 is operative to determine at least one dimension (e.g., a height and/or other dimension(s)) of the face 28 (FIGS. 2-5) in the image 26 (block 118). The processor 96 is operative to define the rectangle 32 in the images 26 (block 120). The step of block 120 includes two sub-steps, the steps of blocks 122 and 124 which are now described. The processor 96 is operative to calculate the dimension(s) of the rectangle 32 as a function of: the dimension(s) of the face 28 (identified in the image 26); optionally knowledge about the field of view of the camera 20 (FIGS. 1-5); and the dimension(s) of the display screen 18 (FIGS. 6A-6C and 7) (block 122). It should be noted that the aspect ratio of the rectangle 32 may be set to be the same as the aspect ratio of the display screen 18. In such a case, if one of the dimensions of the rectangle 32 is calculated (as described above), the other dimension of the rectangle 32 may be determined so that the aspect ratio of the rectangle 32 is the same as the aspect ratio of the display screen 18 as described above, with reference to FIGS. 6A-C and 7. The processor 96 is operative to calculate a horizontal and vertical position of the rectangle 32 in the image 26 as described above, with reference to FIGS. 6A-C and 7 (block 124).

The processor 96 is operative to search for an image of a pointing indicator in the rectangle 32 (FIGS. 2-5) resulting in finding the pointing indicator at a first position in the rectangle 32. The pointing indicator may be the hand 36 with the finger 22 described above with reference to FIGS. 2-5. Alternatively or additionally, the cursor positioning system 10 may be operative to search the rectangle 32 for other pointing indicators, for example, but not limited to, a hand holding a pen or a ruler, and/or part of a hand with a pointing finger, and/or part of a hand holding a pen or a ruler. The processor 96 is operative to search for the image of the pointing indicator in a sliding window which is moved around the rectangle 32 (block 126). The search for the image of the pointing indicator may be based on machine learning of a plurality of images of pointing indicators. The size of the sliding window may be set as a function of one or more dimensions of the face 28 as discussed above with reference to FIGS. 2-5. Alternatively, the search for the image of the pointing indicator may be performed without using a sliding window, based on any other suitable image recognition technique for example, but not limited to, Scale-invariant feature transform (SIFT). The processor 96 is operative to calculate a cursor position of the cursor 24 (FIG. 2-5) on the display screen 18 based on the first position (block 128). The processor 96 may be operative to calculate the cursor position on the display screen 18 based on a horizontal flip and scaling of the first position of the pointing indicator in the rectangle 32.

The processor 96 is operative to prepare a user interface screen presentation 132 (FIGS. 2-5) including the cursor 24 (FIGS. 2-5) placed at the calculated cursor position (block 130). The processor 96 is operative to output the user interface screen presentation 132 for display on the display screen 18 (FIGS. 2-5) (block 134).

The processor 96 is optionally operative to return via branch 136 to the step of block 126 to resume searching for the pointing indicator in the rectangle 32. The processor 96 is optionally operative to return periodically (for example, but not limited to, every 500 milliseconds or every few seconds) via branch 138 from the step of block 134 to the step of block 116 to identify the face 28 in a new image 26 and continue the processing described above from the step of block 116. In other words, the process of the method 114 after the step of block 132 may follow the processing of branch 136 and periodically follow the processing of the branch 138.

In accordance with an alternative embodiment, instead of the method 114 following the branches 136, 138, the processor 96 may be operative to track movement of the pointing indicator over a plurality of the images 26 (FIGS. 2-5) using an object tracking method such as edge tracking as described above with reference to FIGS. 2-5 (block 140) and to return periodically (for example, but not limited to, every 1 to 10 seconds) via branch 142 to the step of block 116 and then proceeding to search for the image of the pointing indicator using a sliding window in different images from the two-dimensional video.

In accordance with yet another alternative embodiment, instead of the method 114 following the branches 136, 138, the processor 96 may be operative to track movement of the pointing indicator over a plurality of the images 26 (FIGS. 2-5) using an object tracking method such as edge tracking as described above with reference to FIGS. 2-5 (block 140) and to return periodically (for example, but not limited to, every 500 milliseconds or every few seconds) via branch 144 to the step of block 126 (and continue the processing described above from the step of block 126) and return from the block 140 less frequently (than the flow down the branch 144) (for example, but not limited to, every 1 to 10 seconds) via branch 142 to the step of block 116.

The processor 96 is operative to remove the cursor from the user interface screen presentation 132 (FIGS. 2-5) when the pointing indicator is not found in one of the two-dimensional images 26 (FIGS. 2-5) from the two-dimensional video.

In practice, some or all of these functions may be combined in a single physical component or, alternatively, implemented using multiple physical components for example, graphical processing unit(s) (GPU(s)) and/or field-programmable gate array(s) (FPGA(s)). These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A method comprising:
   identifying a face, of a meeting attendee, in a first two-dimensional image from a two-dimensional video;
   determining at least one dimension of the face in the first two-dimensional image;
   defining a closed area in the first two-dimensional image, at least one first dimension of the closed area only partially overlapping the at least one dimension of the face, wherein the defining of the closed area includes:
     calculating a position of the closed area in the first two-dimensional image as a function of a position of eyes detected in the face in the first two-dimensional image; and
     calculating the at least one dimension of the closed area based on an angular height of the face, the angular height of the face being calculated based on a measured height of the face and a field view of a camera capturing the two-dimensional video;
   searching for an image of a finger pointing indicator in the closed area resulting in finding the finger pointing indicator at a first position in the closed area; and
   calculating a cursor position of a cursor on a display screen based on the first position.

2. The method according to claim 1, further comprising:
   preparing a user interface screen presentation including the cursor placed at the cursor position; and
   outputting the user interface screen presentation for display on the display screen.

3. The method according to claim 1, further comprising calculating at least one second dimension of the closed area as a function of at least one dimension of the display screen, wherein the defining of the closed area is based on a distance from the display screen to the meeting attendee that is calculated by dividing an estimated length the measured height of the face by a tangent of the angular height of the face.

4. The method according to claim 1, further comprising calculating the cursor position on the display screen based on a horizontal flip and scaling of the first position of the finger pointing indicator in the closed area.

5. The method according to claim 1, further comprising searching for the image of the finger pointing indicator in a sliding window which is moved around the closed area.

6. The method according to claim 5, further comprising searching for the image of the finger pointing indicator based on machine learning a plurality of images of finger pointing indicators.

7. The method according to claim 1, further comprising tracking movement of the finger pointing indicator over a plurality of two-dimensional images from the two-dimensional video using an object tracking method.

8. The method according to claim 7, further comprising periodically searching for the image of the finger pointing indicator using a sliding window in different two-dimensional images from the two-dimensional video.

9. A system comprising:
a processor; and
a memory to store data used by the processor,
wherein the processor is operative, in cooperation with the memory, to:
identify a face, of a meeting attendee, in a first two-dimensional image from a two-dimensional video;
determine at least one dimension of the face in the first two-dimensional image;
define a closed area in the first two-dimensional image, at least one first dimension of the closed area only partially overlapping the at least one dimension of the face, wherein the closed area is defined by:
calculating a position of the closed area in the first two-dimensional image as a function of a position of eyes detected in the face in the first two-dimensional image; and
calculating the at least one dimension of the closed area based on an angular height of the face, the angular height of the face being calculated based on a measured height of the face and a field view of a camera capturing the two-dimensional video;
search for an image of a finger pointing indicator in the closed area resulting in finding the finger pointing indicator at a first position in the closed area; and
calculate a cursor position of a cursor on a display screen based on the first position.

10. The system according to claim 9, wherein the processor is further operative to:
prepare a user interface screen presentation including the cursor placed at the cursor position; and
output the user interface screen presentation for display on the display screen.

11. The system according to claim 9, wherein the processor is further operative to calculate at least one second dimension of the closed area as a function of at least one dimension of the display screen.

12. The system according to claim 9, wherein the processor is further operative to calculate the cursor position on the display screen based on a horizontal flip and scaling of the first position of the finger pointing indicator in the closed area.

13. The system according to claim 9, wherein the processor is further operative to search for the image of the finger pointing indicator in a sliding window which is moved around the closed area.

14. The system according to claim 13, wherein the processor is further operative to search for the image of the finger pointing indicator based on machine learning a plurality of images of finger pointing indicators.

15. The system according to claim 9, wherein the processor is further operative to track movement of the finger pointing indicator over a plurality of two-dimensional images from the two-dimensional video using an object tracking method.

16. The system according to claim 15, wherein the processor is further operative to periodically search for the image of the finger pointing indicator using a sliding window in different two-dimensional images from the two-dimensional video.

17. The system according to claim 9, wherein the processor is further operative to remove the cursor from a user interface screen presentation when the finger pointing indicator is not found in a two-dimensional image from the two-dimensional video.

18. A software product, comprising a non-transient computer-readable medium in which program instructions are stored, which instructions, when read by a central processing unit (CPU), cause the CPU to:
identify a face, of a meeting attendee, in a first two-dimensional image from a two-dimensional video;
determine at least one dimension of the face in the first two-dimensional image;
define a closed area in the first two-dimensional image, at least one first dimension of the closed area only partially overlapping the at least one dimension of the face, wherein the closed area is defined by:
calculating a position of the closed area in the first two-dimensional image as a function of a position of eyes detected in the face in the first two-dimensional image; and
calculating the at least one dimension of the closed area based on an angular height of the face, the angular height of the face being calculated based on a measured height of the face and a field view of a camera capturing the two-dimensional video;
search for an image of a finger pointing indicator in the closed area resulting in finding the finger pointing indicator at a first position in the closed area; and
calculate a cursor position of a cursor on a display screen based on the first position.

19. The software product of claim 18, wherein the program instructions are further operable to cause the CPU to:
prepare a user interface screen presentation including the cursor placed at the cursor position; and
output the user interface screen presentation for display on the display screen.

20. The software product of claim 18, wherein the program instructions are further operable to cause the CPU to calculate at least one second dimension of the closed area as a function of at least one dimension of the display screen.

* * * * *